(12) United States Patent
Rozman et al.

(10) Patent No.: US 8,217,616 B2
(45) Date of Patent: *Jul. 10, 2012

(54) ELECTRIC MOTOR CONTROL WITH BUCK BOOST CONVERTER

(75) Inventors: Gregory I. Rozman, Rockford, IL (US); Kevin Dooley, Mississauga (CA)

(73) Assignees: HJamilton Sundstrand Corporation, Rockford, IL (US); Pratt & Whitney Canada Corp., Longueuil, Quebec (CA)

( * ) Notice: Subject to any disclaimer, the term of this patent is extended or adjusted under 35 U.S.C. 154(b) by 752 days.

This patent is subject to a terminal disclaimer.

(21) Appl. No.: 11/934,170

(22) Filed: Nov. 2, 2007

(65) Prior Publication Data
US 2009/0115269 A1    May 7, 2009

(51) Int. Cl.
*H02P 27/00* (2006.01)

(52) U.S. Cl. ......... 318/712; 318/493; 310/53; 310/68 C; 310/68 D; 310/201; 310/266; 361/23

(58) Field of Classification Search .................. 318/493, 318/712; 310/53, 68 C, 68 D, 201, 266, 52; 361/23
See application file for complete search history.

(56) References Cited

U.S. PATENT DOCUMENTS

| | | | |
|---|---|---|---|
| 4,689,543 A | 8/1987 | Hucker | |
| 5,006,768 A | 4/1991 | Rozman | |
| 5,235,504 A | 8/1993 | Sood | |
| 5,430,362 A * | 7/1995 | Carr et al. | 318/779 |
| 5,493,201 A * | 2/1996 | Baker | 322/10 |
| 5,747,971 A | 5/1998 | Rozman | |
| 5,808,884 A | 9/1998 | Teggatz | |
| 5,872,703 A | 2/1999 | Williams | |
| 5,952,856 A | 9/1999 | Horiguchi | |
| 6,121,698 A * | 9/2000 | Sexton | 310/54 |
| 6,121,800 A | 9/2000 | Leighton | |
| 6,373,728 B1 | 4/2002 | Aarestrup | |
| 6,771,040 B2 * | 8/2004 | Kusumoto et al. | 318/801 |
| 6,891,346 B2 | 5/2005 | Simmons | |
| 7,045,986 B2 * | 5/2006 | Anghel et al. | 318/712 |
| 7,227,271 B2 * | 6/2007 | Anghel et al. | 290/31 |
| 7,327,113 B2 | 2/2008 | Steigerwald | |
| 7,443,642 B2 * | 10/2008 | Dooley | 361/23 |
| 7,701,678 B2 * | 4/2010 | Dooley | 361/23 |
| 7,710,058 B2 * | 5/2010 | Rozman et al. | 318/494 |
| 7,880,424 B2 * | 2/2011 | Seguchi | 318/712 |

(Continued)

FOREIGN PATENT DOCUMENTS

JP    2003189636 A  *  7/2003

OTHER PUBLICATIONS

Machine translation of JP 2003189636 A.* U.S. Appl. No. 11/420,602, filed May 26, 2006.
Power Electronics and Variable Frequency Drives—Technology and Applications, The Institute of Electrical and Electronics Engineers, Inc., New York.

*Primary Examiner* — Walter Benson
*Assistant Examiner* — Kawing Chan
(74) *Attorney, Agent, or Firm* — Carlson, Gaskey & Olds, PC

(57) ABSTRACT

A power supply for an electric motor includes a converter that can increase and decrease a voltage supplied into an inverter and then into the stator windings of the motor. As a separate feature, the inverter includes a control coil which is positioned within a motor housing such that it may be cooled by a thermal management system for the motor.

17 Claims, 2 Drawing Sheets

U.S. PATENT DOCUMENTS

| | | | |
|---|---|---|---|
| 2001/0038270 A1* | 11/2001 | Roth-Stielow et al. | 318/362 |
| 2002/0030462 A1* | 3/2002 | Matsushiro et al. | 318/727 |
| 2002/0079706 A1* | 6/2002 | Rebsdorf et al. | 290/55 |
| 2003/0030409 A1* | 2/2003 | Kusumoto et al. | 318/801 |
| 2003/0146726 A1* | 8/2003 | Ishikawa et al. | 318/442 |
| 2005/0001582 A1* | 1/2005 | Goto et al. | 318/802 |
| 2005/0189888 A1* | 9/2005 | Federman et al. | 318/67 |
| 2005/0254265 A1* | 11/2005 | Yamada | 363/13 |
| 2006/0103341 A1* | 5/2006 | Steigerwald et al. | 318/712 |
| 2006/0267527 A1* | 11/2006 | Khopkar et al. | 318/254 |
| 2008/0290824 A1* | 11/2008 | Choi et al. | 318/139 |

* cited by examiner

ELECTRIC MOTOR CONTROL WITH BUCK BOOST CONVERTER

BACKGROUND OF THE INVENTION

This application relates to a voltage supply for an electric motor wherein a buck boost converter is able to increase or decrease voltage being directed into an inverter, and then to the motor. In addition, an inductive coil for the converter extends away from the converter, and into the motor housing such that it can be cooled by a thermal management system for the motor.

Typically, a voltage supply for an electric motor is directed into a converter for changing the voltage that is ultimately supplied to an inverter, and then to stator windings of the electric motor.

In the past, electric motors with this basic architecture have utilized a buck converter, which is operable to lower the voltage when desired. As an example, when operating at a low speed, the buck converter is operable to decrease the voltage, thus providing more efficient operation of the motor.

A feature of prior motor architectures is that the converter would typically be provided with a control or inductor coil. This coil often becomes quite hot during operation, and cooling systems for the converter thus must be relatively robust in large part to cool the coil.

While inductors that have been part of various controls have been positioned within a motor housing for cooling, such inductors have not been part of a voltage converter that is positioned outside of the motor housing.

While buck boost converters which can both increase and decrease voltage are known, they have not been provided into an electric motor voltage supply.

SUMMARY OF THE INVENTION

In disclosed embodiments of this invention, a buck boost converter is associated with an inverter for supplying power to an electric motor. In a separate feature, a control coil for the converter extends away from the converter and into an interior housing of the electric motor, such that a thermal management system for cooling the electric motor can also cool the inductor.

These and other features of the present invention can be best understood from the following specification and drawings, the following of which is a brief description.

DETAILED DESCRIPTION OF THE PREFERRED EMBODIMENT

Figure 1:
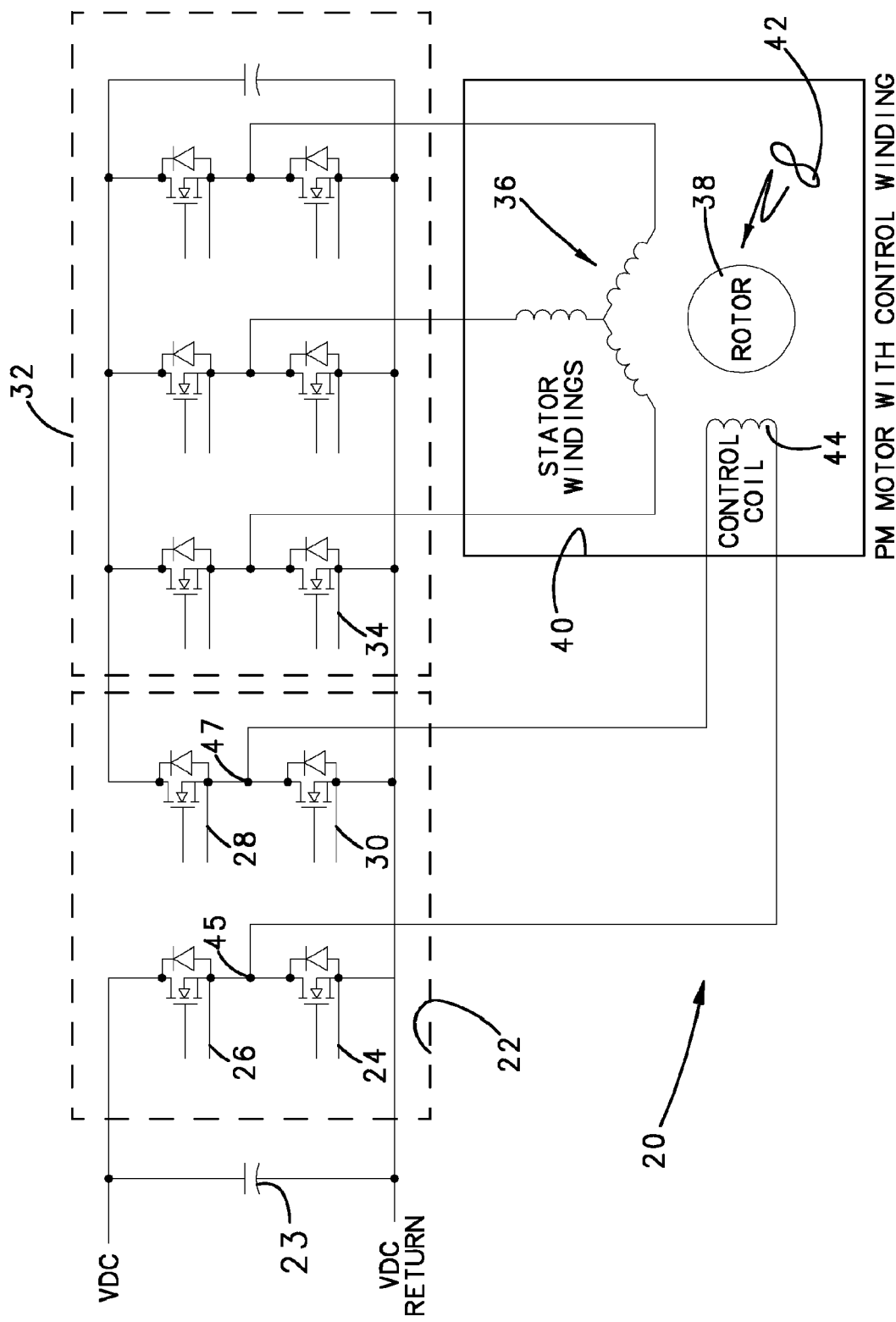
FIG. 1 shows a first schematic power supply circuit of the present invention.

An electric motor and power supply 20 are illustrated in FIG. 1. A voltage supply is associated with a capacitor 23, and a voltage converter 22. The voltage converter 22 includes switches 24, 26, 28 and 30. An inverter 32 having a plurality of switches 34 is positioned downstream of the converter 22. The inverter directs voltage into the stator windings 36 which are operable to drive the rotor 38. The windings 36 and rotor 38 are mounted within a motor housing 40. As known, a thermal management system for the motor, such as a fan 42, directs cooling fluid over the rotor 38 and the stator 36. While a fan moving air is illustrated, other ways of directing a cooling fluid within the housing 40 are known, and would come within the scope of this invention.

A control coil or inductor 44 is connected at 45 and 47 into the converter 22. As is clear, the connection 45 of the control coil or inductor 44 is intermediate switches 24 and 26, and the connection 47 is intermediate switches 28 and 30. The control coil 44 extends away from the converter 22, and within the housing 40 such that it can be cooled by the cooling fluid utilized to cool the motor elements. The converter itself, other than the control coil, is mounted outside the motor housing.

In operation, the converter 22 is a buck boost converter. The converter 22 has switch 28 closed and switch 30 opened at low speeds. At higher speeds, switch 26 is closed and switch 24 is opened, with switch 28 closed and switch 30 providing a boost, or voltage increase, function.

During failure mode, the switches 26 and 28 are opened and switches 24 and 30 are closed.

Figure 2:
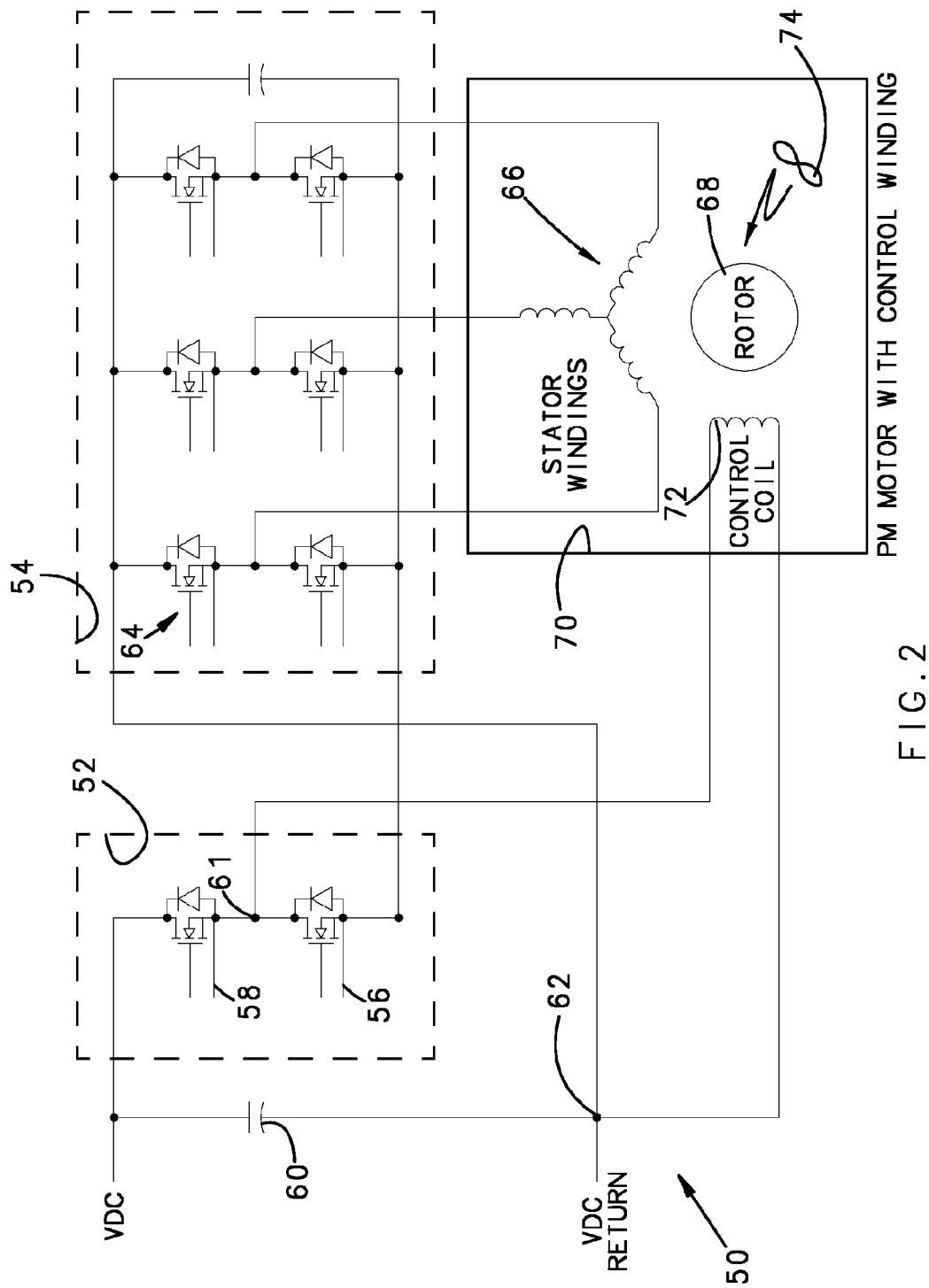
FIG. 2 shows a second schematic power supply circuit.

In FIG. 2, an alternate voltage supply circuit 50 is illustrated. Again, capacitor 60 is positioned upstream of a converter 52. The inverter 54 includes a plurality of switches 64 supplying voltage to the stator windings 66 for driving the rotor 68. The coil 72 extends within the housing 70 and is cooled by the thermal management system 74. The coil 72 is connected at 61 and 62. The connection 61 is intermediate switches 56 and 58 on the converter 52. The connection 62 is upstream of the converter. The converter 52 includes switches 56 and 58. A duty cycle of the voltage supplied is utilized to provide a buck boost output voltage. The output voltage, $V_{out}$ can be defined by the following equation:

$$V_{out} = -Vn(D/1-D)$$

with D being the duty cycle. Switch 56 is opened, and switch 58 provides the buck boost function. During the failure mode, the switch 58 is opened and switch 56 is closed.

The operation of the buck boost converters 22 and 52 as shown in FIGS. 1 and 2 may be generally as known in the art. Moreover, any number of other arrangements can be utilized to provide the buck boost function. It is not the structure of any one buck boost converter which is inventive in this application, but rather the use of a buck boost converter associated with an inverter and an electric motor. In particular, as is clear from FIGS. 1 and 2, the converters feed directly into the inverters. Moreover, the position of the control coil within the housing is also novel.

While permanent magnet motors are illustrated, the invention would extend to all types of motors. One particular motor that may be utilized with this invention is disclosed in U.S. Pat. No. 7,262,539.

Although an embodiment of this invention has been disclosed, a worker of ordinary skill in this art would recognize that certain modifications would come within the scope of this invention. For that reason, the following claims should be studied to determine the true scope and content of this invention.

What is claimed is:

1. An electric motor and power supply comprising:
   a motor rotor and stator windings within a motor housing;
   a converter operable to receive an input voltage, and selectively increase and decrease said input voltage as desired;
   an inverter positioned between said converter and said stator windings; and
   a control coil connected into the converter, and extending to be adjacent the motor rotor.

2. The power supply as set forth in claim 1, wherein said converter includes two switches, and a duty cycle of the input voltage is utilized to increase and decrease the input voltage.

3. The power supply as set forth in claim 2, wherein said control coil has at least two connections, with the first of said connections connected intermediate said two switches.

4. The power supply as set forth in claim 3, wherein a second connection of said control coil is upstream of said two switches.

5. The power supply as set forth in claim 1, wherein said converter includes two pair of switches, and the increase and decrease in the input voltage is achieved by selectively opening and closing said two pair of switches.

6. The power supply as set forth in claim 5, wherein said control coil has two connections to said converter, with one of said connections being mounted intermediate the two switches in one of said two pairs of switches, and the other of said connections being intermediate the other of said two pair of switches.

7. The power supply as set forth in claim 1, wherein said control coil being positioned within said motor housing, and a thermal management system for the motor moving a fluid within said motor housing to cool the electric motor and the control coil.

8. The power supply as set forth in claim 7, wherein a fluid moving member moves the fluid within the motor housing.

9. The power supply as set forth in claim 1, wherein said converter has an output directly connected to said inverter.

10. The power supply as set forth in claim 1, wherein said converter is operable to increase the said input voltage when the motor is operating at higher speeds.

11. An electric motor and power supply comprising:
a motor rotor and stator windings within a motor housing;
a converter operable to receive an input voltage, and change the input voltage as desired;
an inverter positioned between said converter and said stator windings;
a control coil connected into said converter, said control coil extending from said converter into said motor housing, said converter being outside said motor housing; and
a thermal management system for the motor moving a fluid within said motor housing to cool the electric motor and the control coil.

12. The power supply as set forth in claim 11, wherein a fluid moving member moves the fluid within the motor housing.

13. The power supply as set forth in claim 11, wherein said converter has an output directly connected to said inverter.

14. The power supply as set forth in claim 11, wherein said converter includes two switches, and a duty cycle of the input voltage is utilized to change the input voltage.

15. The power supply as set forth in claim 11, wherein said converter includes two pair of switches, and the change in the input voltage is achieved by selectively opening and closing said two pair of switches.

16. The power supply as set forth in claim 11, wherein said converter is operable to increase and decrease the input voltage.

17. The power supply as set forth in claim 16, wherein said converter is operable to increase the said input voltage when the motor is operating at higher speeds.

* * * * *